United States Patent
Meibach et al.

(10) Patent No.: US 6,908,637 B2
(45) Date of Patent: Jun. 21, 2005

(54) PROCESS FOR DEBITTERING PEANUT HEARTS

(75) Inventors: Ronald L. Meibach, Deerfield, IL (US); Ahmad Akashe, Mundelein, IL (US); George W. Haas, Mount Prospect, IL (US); Leslie G. West, Glencoe, IL (US)

(73) Assignee: Kraft Foods Holdings, Inc., Northfield, IL (US)

(*) Notice: Subject to any disclaimer, the term of this patent is extended or adjusted under 35 U.S.C. 154(b) by 26 days.

(21) Appl. No.: 10/322,939

(22) Filed: Dec. 18, 2002

(65) Prior Publication Data

US 2003/0203089 A1 Oct. 30, 2003

Related U.S. Application Data

(63) Continuation-in-part of application No. 10/133,955, filed on Apr. 26, 2002.

(51) Int. Cl.$^7$ .............................. A23L 1/36; A23L 1/015
(52) U.S. Cl. ....................... 426/431; 426/486; 426/488; 426/632
(58) Field of Search ................................ 426/431, 430, 426/488, 486, 632

(56) References Cited

U.S. PATENT DOCUMENTS 2,833,651 A * 5/1958 Anson et al.
3,023,107 A * 2/1962 Mustakas et al.
3,043,826 A * 7/1962 Beaber et al.

(Continued)

FOREIGN PATENT DOCUMENTS

JP        53-79050      *  7/1978

OTHER PUBLICATIONS

Price, K.R., et al, The Chemistry and Biological Significance of Saponins in Foods and Feedingstuffs, Critical Review of Food Science and Nutrition, 1987, pp. 27–135, vol. 26, issue 1.

(Continued)

*Primary Examiner*—Anthony Weier
(74) *Attorney, Agent, or Firm*—Fitch, Even, Tabin & Flannery (57) ABSTRACT

The present invention involves methods for preparing a processed peanut product containing high levels of peanut hearts material, with the peanut heart material being substantially stripped of bitter taste so as to provide debittered peanut hearts of comparable taste to actual peanuts or as being flavorless without adversely affecting the taste of a foodstuff end product. The processed product includes whole or fragmented peanut hearts and peanut heart powder processed using alkaline wash, neutralization, and drying for inactivating enzymes and removing bitter flavoring components. The peanut heart materials are debittered by adjusting the pH to about 8 to about 12 with an alkali material (e.g., sodium hydroxide) to solubilize the protein content and release the bitter flavor compounds making it possible to separate such compounds by ultrafiltration. The alkali treated peanut heart material is neutralized with an acidic aqueous solution.

16 Claims, 2 Drawing Sheets

U.S. PATENT DOCUMENTS

| | | | |
|---|---|---|---|
| 3,295,985 A | * | 1/1967 | Cavanagh |
| 3,579,496 A | * | 5/1971 | Martinez et al. |
| 3,947,599 A | * | 3/1976 | Mitchell, Jr. ................. 426/250 |
| 3,998,800 A | * | 12/1976 | Youngquist ................. 530/378 |
| 4,008,210 A | * | 2/1977 | Steele et al. ................ 530/377 |
| 4,113,889 A | * | 9/1978 | Baxley ....................... 426/509 |
| 4,190,577 A | * | 2/1980 | Steele et al. ................ 530/377 |
| 4,211,694 A | * | 7/1980 | Youngquist ................. 530/377 |
| 4,276,316 A | * | 6/1981 | Sharma ....................... 426/466 |
| 4,476,057 A | * | 10/1984 | Matsunaga .................... 554/11 |
| 4,477,480 A | * | 10/1984 | Seidel et al. ................ 426/578 |
| 4,515,818 A | * | 5/1985 | MacDonald et al. ........ 426/268 |
| 4,744,524 A | * | 5/1988 | Gupta et al. .................. 241/36 |
| 4,761,186 A | * | 8/1988 | Schara et al. ................. 127/71 |
| 4,889,921 A | * | 12/1989 | Diosady et al. ............. 530/377 |
| 5,417,999 A | * | 5/1995 | Cammarn et al. .......... 426/633 |
| 5,756,543 A | * | 5/1998 | Katsuragi et al. ........... 514/547 |
| 5,766,622 A | * | 6/1998 | Nelson ....................... 424/440 |
| 5,785,984 A | * | 7/1998 | Kurihara et al. ............ 424/439 |
| 5,942,275 A | * | 8/1999 | Wong et al. ................. 426/631 |
| 6,015,913 A | * | 1/2000 | Kealey et al. ............... 549/386 |
| 6,172,248 B1 | * | 1/2001 | Copeland et al. ........... 554/190 |
| 6,197,356 B1 | * | 3/2001 | Girsh ......................... 426/312 |

OTHER PUBLICATIONS

Dieckert, J.W., et al, "Saponins of the Peanut: Isolation of Some Peanut Sapogenins and Their Comparison with the Soya Sapogenols by Glass–Paper Chromatography," Archives of Biochemistry and Biophysics, 1959, pp. 220–228, vol. 82.

Dieckert, J.W. and Morris, N.J., "Bitter Principles of the Peanut, Isolation, General Properties, and Distribution in the Seed.," Agricultural and Food Chemistry, Dec. 1958, pp. 930–933, vol. 6, No. 12.

Chien, P.J., et al, "Monitoring Enzymatic debittering in Grapefruit Juice by High Performance Liquid Chromatography," Journal of Food and Drug Analysis, 2001, pp. 115–120, vol. 9, No. 2.

* cited by examiner

PROCESS FOR DEBITTERING PEANUT HEARTS

RELATED APPLICATION

The present application is a continuation-in-part of U.S. patent application Ser. No. 10/133,955, filed on Apr. 26, 2002, which is hereby incorporated by reference.

FIELD OF THE INVENTION

The present invention relates to utilization of peanut hearts or the germ of the peanut in the preparation of peanut products in large volume. The debittered peanut heart compositions of this invention are especially suitable for use in, for example, peanut butters, sauces, grits, candies, energy bars, and the like. Peanut hearts constitute a portion of the peanut that is generally not acceptable for human consumption at high levels due to extremely bitter taste. The present invention provides processes for producing debittered peanut heart materials having taste comparable to actual peanuts for incorporation into end products at relative high levels for significant cost savings. These processes allow for debittering peanuts, especially peanut hearts, both as whole or fragmented pieces or as debittered peanut heart powder produced using described water-based processes of the invention.

BACKGROUND OF THE INVENTION

Peanuts constitute an important foodstuff and are often employed as a material ingredient in end products for their substantial food value (e.g., substantial protein and oil content). However, peanut hearts or germs have an extremely bitter taste. Thus, peanut heart material is normally discarded in commercial food processing so as to limit or eliminate significant levels of peanut heart materials in end products because of consumers' preferences for non-bitter food products. Moreover, a bitter tasting substance can often be sensed even when it is present in extremely small amounts as compared to other materials present in the end product. Accordingly, the presence of an unpleasant bitter taste is of serious concern in the food industry, and further may be problematic in other industries such as the medicinal and pharmaceutical industries. See, e.g., Dieckert et al., "Bitter Principles of the Peanut. Isolation, General Properties, and Distribution in the Seed," Agric. & Food Chem., 6, 930–933 (1958); Dieckert et al., "Saponins of the Peanut: Isloation of Some Peanut Sapogenins and Their Comparison with the Soya Sapogenois by Glass-Paper Chromatography," Arch. Biochem & Biophy, 82, 220–228 (1959); Price et al., "The Chemistry and Biological Significance of Saponins in Foods and Feedingstuffs," Crit. Rev. Food Sce & Nutrit., 26, 27–49 (1987). The desire for improved palatability has prompted the development of numerous approaches for inhibiting, masking, or otherwise reducing bitterness so as to not affect the overall flavor in the resulting foodstuff. Such problems have been recognized for many years.

An example of previously employed methods to purify organic materials is shown in U.S. Pat. No. 4,477,480 to Seidel et al. for "Method Of Preparing A Clean Flavored Cereal Starch" issued Oct. 16, 1984, in which starch is treated with an alkali to remove objectionable flavor components. In U.S. Pat. No. 4,761,186 to Schara et al. for "Method Of Purifying Starches And Products Produced Therefrom" issued Aug. 2, 1988, ultrafiltration is used to purify starch. In both cases, flavor components are removed from the starch, in the '480 patent by solubilizing the flavor components so that they can be washed out of the relatively insoluble starch. In the '186 patent, ultrafiltration was used to remove the flavor components as permeate while the insoluble starch remained in an aqueous slurry.

U.S. Pat. No. 6,197,356 B1 to Girsh for "Process For Preparing Hypoallergenic Foods" issued Mar. 6, 2001, provides for a method for rendering common allergenic foods, including peanuts, hypoallergenic by heat treatment with a super critical fluid or gas (e.g., super critical carbon dioxide or liquid nitrogen). U.S. Pat. No. 5,785,984 to Kurihara et al. for "Taste-Modifying Method And Bitterness-Decreasing Method" issued Jul. 28, 1998, provides for a protein-lipid complex which, when added to food (including peanuts) or other compositions, decreases bitterness. The complex appears to mask the bitterness rather than eliminate it from the product. U.S. Pat. No. 5,766,622 to Nelson for "Inhibiting Undesirable Taste In Oral Compositions" issued Jun. 16, 1998, provides for a method of inhibiting an undesirable taste in food (including peanuts) and other compositions by the addition of a phosphorylated amino acid. U.S. Pat. No. 5,756,543 to Katsuragi et al. for "Bitterness-Relieving Agent" issued May 26, 1998, provides for a bitterness-relieving agent which can be added to food (including peanuts) and other compositions. The agent is an ester of a mono- or diglyceride with a polycarboxylic acid or a salt thereof. U.S. Pat. No. 4,211,694 to Youngquist for "Deflavoring Vegetable Seed Materials" issued Jul. 8, 1980, provides for a method for deflavoring vegetable seed materials (including peanuts) using a ternary single-phase solution of water, electrolyte, and carbohydrate. The solution has a water activity of less than about 0.9. The process can be carried out by suspending the seed material in the solution and mixing for about 10 minutes to about 24 hours at a temperature of about 0 to about 120° C. U.S. Pat. No. 3,998,800 to Youngquist for "Deflavoring Oleaginous Seed Protein Materials" issued Dec. 21, 1976, provides for a method for deflavoring oleaginous seed materials (including peanuts) using a single phase composition containing a non-polar oxygen-containing organic solvent (e.g., alcohol) and water. U.S. Pat. No. 3,947,599 to Mitchell, Jr. for "Process For Making Flavorless Food Extenders Derived From Peanuts, And A Method Of Recovering Peanut Oil" issued Mar. 30, 1976, provides for a method for preparing flavorless peanut flakes. This method comprises coarsely grinding blanched unroasted peanuts, mixing with water, forming a suspension of finely divided peanut particles and emulsified oil, drying the emulsion-suspension to form flakes, extracting oil from the flakes using an organic solvent (e.g., hydrocarbon), and removing residual solvent from the flakes.

As can be seen from the above summary, the problem of debittering peanut hearts has not been adequately addressed in the food processing arts. Moreover, none of the prior art specifically provides for debittering processes that take advantage of a water-based process for processing peanut hearts for human consumption. Inasmuch as peanut hearts generally are associated with an extremely bitter flavor, much more so than many other foodstuffs, it is not readily apparent that any known prior art processes could produce debittered peanut hearts.

SUMMARY OF THE INVENTION

The present invention provides methods for incorporating peanut hearts into food products for human consumption, even at high levels in which the debittered peanut hearts are of comparable taste to actual peanuts or provided as flavorless peanut hearts so as to not adversely affect the taste of the food product. Both whole debittered peanut hearts and debittered peanut heart powder may be produced using a water-based process of the present invention. Thus, the use of organic solvents is avoided.

The present invention discloses a method of obtaining whole or fragmented peanut heart material substantially free of bitter taste, the method including the steps of:

(1) washing whole or fragmented peanut heart material with an aqueous alkaline solution;
(2) repeating step (1) until the whole or fragmented peanut heart material is substantially free of bitter taste;
(3) neutralizing the alkaline-washed whole or fragmented peanut heart material with an aqueous acidic solution; and
(4) drying the peanut hearts from step (4) to obtain the whole or fragmented peanut heart material substantially free of bitter taste. Preferably, the whole or fragmented peanut heart material is blanched in hot or boiling water prior to the alkaline wash treatment. If desired, the whole or fragmented peanut heart material substantially free of bitter taste may be roasted prior to use.

In addition, the present invention further discloses a method for producing peanut heart powder substantially free of bitter taste, the method including the steps of:

(1) grinding peanut hearts to form an aqueous slurry containing peanut heart material;
(2) alkalizing the aqueous slurry with an aqueous alkaline solution;
(3) filtering the aqueous slurry before or after step (2) to remove large particles of the peanut heart material;
(4) treating the alkalized and filtered aqueous slurry with an ultrafiltration process to remove bitter flavor components;
(5) repeating steps (2) and (4) until the peanut heart material in the aqueous slurry is substantially free of bitter taste;
(6) neutralizing the aqueous slurry from step (5) with an aqueous acidic solution; and
(7) drying the neutralized aqueous solution from step (6) to obtain peanut heart powder substantially free of bitter taste. Preferably, the peanut heart material is blanched in hot or boiling water prior to the alkaline treatment. If desired, the peanut heart powder substantially free of bitter taste may be roasted prior to use.

The present invention also discloses a method of obtaining whole or fragmented peanut heart material substantially free of bitter taste, the method including the steps of:

(1) washing whole or fragmented peanut heart material with an aqueous alkaline solution;
(2) repeating step (1) until the whole or fragmented peanut heart material is substantially free of bitter taste;
(3) neutralizing the alkaline-washed whole or fragmented peanut heart material with an aqueous acidic solution; and
(4) drying the peanut hearts from step (4) to obtain the whole or fragmented peanut heart material substantially free of bitter taste. Preferably, the whole or fragmented peanut heart material is blanched in hot or boiling water prior to the alkaline wash treatment. If desired, the whole or fragmented peanut heart material substantially free of bitter taste may be roasted prior to use.

The spent aqueous alkaline solution used to wash the peanut heart material will contain both bitter flavor compounds as well as peanut flavor precursors. If desired, the spent aqueous alkaline solution used to wash the peanut heart material (i.e., the wash solution), especially the aqueous alkaline solution derived from the first washing step, can be collected, neutralized, treated to remove the bitter flavor compounds, and then added back to the peanut heart material prior to the drying step, in order to enhance the desired peanut flavor. In one preferred embodiment, the wash solution can be treated with an enzyme having glycosidase activity, which will effectively remove or reduce bitterness in the wash solution while maintaining significant levels of flavor components or precursors. Enzymes having glycosidease activity include, but are not limited to, amylases, glucoamylases, glucosidases, galactosidases, lactases, and the like as well as mixtures thereof. Proteases and lipases having glycosidease activities can also be used. The wash solution, when added back to the treated peanut material before drying, will allow the development of improved peanut flavors in the final product.

The debittered peanut heart material obtained from the processes of the invention allow the incorporation of high levels of peanut heart material in a wide range of foods without the bitterness normally associated with peanut hearts. Moreover, debittered peanut heart material obtained from the processes of the invention in which at least the initial wash solution is treated to effectively remove or reduce bitterness while maintaining significant levels of flavor components or precursors allow the use of high levels of peanut heart material in a wide range of foods without the bitterness normally associated with peanut hearts and with improved peanut flavors.

In one aspect, the invention is a method of debittering peanut heart materials including adjusting the pH to about 8 to about 12 (preferably about 10 to about 11) with an alkali material (e.g., sodium hydroxide) to solubilize the protein content and release the bitter flavor compounds, making it possible to separate and remove the bitter flavor components associated with the bitter characteristic and, thereby, produce peanut heart material that is substantially free of bitter taste. For purposes of this invention, removal of essentially all of the bitter flavoring compounds or being substantially stripped or free of bitter taste is achieved when the bitterness has been reduced to an acceptable level or, more preferably, has been essentially eliminated. In another aspect, the invention is a method of debittering peanut heart materials including adjusting the pH to about 8 to about 12 (preferably about 10 to about 11) with an alkali material (e.g., sodium hydroxide) to solubilize and release the bitter flavor compounds, making it possible to separate and remove the bitter flavor components associated with the bitter characteristic as a wash solution, treating the wash solution to remove or reduce the bitter flavor compounds therein while maintaining significant levels of desirable flavor components or precursors, and then adding the treated wash solution to the peanut heart material, thereby, producing peanut heart material that is substantially free of bitter taste and has improved peanut flavors.

Both whole peanut heart material and powered peanut heart material can be produced by the methods of the present invention. For whole peanut heart material, whole or fragmented peanut heart material is optionally blanched in hot (greater than about 90° C.) or, preferably, boiling water. The whole or fragmented peanut heart material (blanched or unblanched) is washed with a basic aqueous solution until it is substantially free of bitter taste. After neutralizing with an acidic aqueous solution, the whole peanut material (with or without added treated wash solution) is dried to obtain the debittered peanut heart material. If desired, this material can be roasted.

For powdered peanut heart material, whole or fragmented peanut heart material is optionally blanched in hot (greater than about 90° C.) or, preferably, boiling water. The whole or fragmented peanut heart material (blanched or unblanched) is ground to form an aqueous slurry (e.g., wet milling). The slurry is pH-adjusted with an aqueous alkaline solution and then subjected to ultrafiltration using a membrane capable of retaining substantially all of the protein content while removing bitter flavoring components as permeate. The aqueous slurry is prefiltered to remove large particles (e.g., insoluble fibers) either before or after the pH of the slurry is adjusted. The permeate containing bitter flavor components and water is exposed to a reverse osmosis membrane to dewater the permeate; the separated water can be added to the ultrafiltered retentate for multiple passes. The peanut heart materials are batch, semi-continuously, or continuously processed wherein a pH-adjusted aqueous slurry is exposed to an ultrafiltration membrane and/or reverse osmosis membrane, the permeate is separated for recovery or removal of the bitter flavor components, and the retentate is recycled to treat fresh pH-adjusted peanut materials. Water is added periodically or continuously to replace the water lost to the permeate and to adjust the concentration of peanut materials in the combined stream to a predetermined level. The process (i.e., alkaline washing followed by ultrafiltration) is continued until essentially all of the bitter flavoring compounds have been removed and the peanut heart material is substantially free of bitter taste. After neutralizing with an acidic aqueous solution, the resulting material is dried to obtain the debittered peanut heart material. If desired, this material can be roasted.

DETAILED DESCRIPTION OF THE PREFERRED EMBODIMENTS

The present invention provides peanut compositions, and particularly peanut heart compositions, and methods of preparing and using peanut hearts that offer improved utilization of such food material for human consumption at high levels. The peanut compositions, and especially the peanut heart compositions, of the present invention have been stripped of bitter taste and have a pleasant peanut flavor. The starting material of the present invention comprise peanuts that generally include peanut hearts or the germ of the peanut processed for use in a wide variety of food products. The debittered peanut heart products are provided as processed peanut hearts, fragments, or ground peanut heart powder material substantially stripped of bitter taste, and having a pleasant peanut flavor.

Debittering may be accomplished with alkali treatment due to the solubility of phenolic compounds at an alkaline or basic pH. This concept as applied to peanut heart materials provides a number of embodiments in accordance with the invention for alkaline washing and pH-adjustment for the release and separation of bitter flavor compounds through alkaline washing or alkaline washing combined with ultrafiltration (with or without diafiltration) and the like as processes for debittering peanut hearts. The processed product includes whole or fragmented peanut hearts and peanut heart powder processed using blanching (an optional step), alkaline wash neutralization, and drying. The peanut heart materials are debittered by adjusting the pH to about 8 to about 12 (preferably about 10 to about 11) with an alkali material such as sodium, potassium, calcium, or magnesium hydroxides to solubilize the protein content and release the bitter flavor compounds making it possible to separate such compounds from the desired peanut heart material. The alkali treated peanut heart material is neutralized with an acidic water solution.

A first process (see FIG. 1) produces a whole or fragmented debittered peanut heart. This process involves optionally blanching peanut hearts in hot (greater than about 90° C.) or, preferably, boiling water. The blanched or unblanched peanut heart material is then treated by successive washings (e.g., 2–6 washings) in an alkaline solution at about 25 to about 65° C. After the alkaline washing is complete, the peanut heart material is neutralized with an appropriate aqueous acid solution (e.g., 0.5N HCl) wash to a pH of about 5 to about 7.5, and preferably to a pH of about 7. Suitable aqueous acid solutions include, for example, aqueous HCl, aqueous citric acid, aqueous phosphoric acid, and the like. The peanut heart material may then be dried in a conventional oven (e.g., conduction, convection oven, belt dryer, fluid bed dryer, freeze drier, spray dryer, or the like). If desired, this material can be roasted.

A second process (see FIG. 2) produces a debittered peanut heart powder. This process involves optionally blanching the peanut heart material in hot (greater than about 90° C.) or, preferably, boiling water. The blanched or unblanched peanut heart material is then ground into a slurry and filtered to remove large particulates (i.e., particles, especially insoluble fibers, having an average diameter or length of greater than about 100 microns). Although not shown in the figure, this filtration step can be carried out after the pH of the slurry is adjusted. The resulting aqueous slurry suspension is then alkalized and subject to ultrafiltration (with or without diafiltration) multiple times. The resulting peanut product is then neutralized using an aqueous acid solution (e.g., 0.5N HCl) to a pH of about 5 to about 7.5, and preferably to a pH of about 7. Suitable aqueous acid solutions include, for example, aqueous HCl, aqueous citric acid, aqueous phosphoric acid, and the like. The peanut heart powder end product is produced by drying in a conventional oven (e.g., conduction, convection oven, belt dryer, fluid bed dryer, freeze drier, spray dryer, or the like). If desired, this material can be roasted.

Any of the processes of the present invention can be combined with a further process (see FIG. 3) wherein at least the initial alkaline wash material, which contains bitter components as well as flavor components or precursors, can be treated to remove the bitter components while maintaining at least some of the flavor components. The treated alkaline wash material can then be added back to the treated peanut heart material for further processing to provide a debittered peanut heart material with improved peanut flavor.

Many food producers utilize peanuts and peanut products in large volume. Products include peanut butters, sauces, grits, candies, energy bars, roasted peanuts, and the like. Peanut hearts constitute a portion of the peanut that is normally not consumed in high levels due to its extremely bitter taste. The process of debittering peanut hearts makes them comparable in taste to actual peanuts which can be incorporated into different products and at higher levels in such foodstuff end products. In additions, significant cost savings can be realized by being able to process and incorporate the peanut heart material into products for human consumption.

Figure 1:
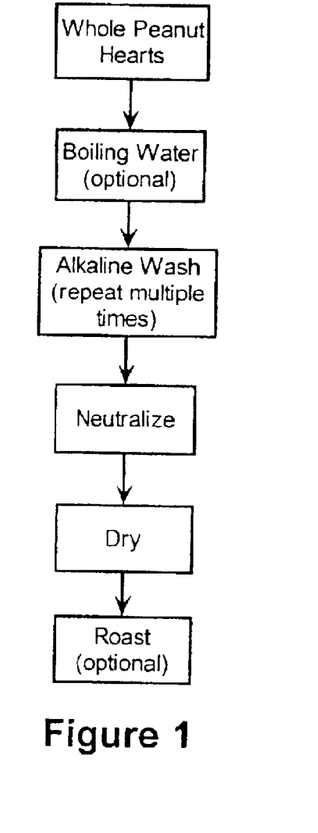
FIG. 1 is a block diagram of one process employing the invention in which whole peanut hearts are optionally blanched in boiling water followed by successive washings (e.g., about 2–6 washings) in an aqueous alkaline solution (e.g., 1N NaOH) at about 25 to about 65° C. The alkaline-washed peanut hearts are then washed with a neutralizing aqueous solution (e.g., 0.5N HCl) to a pH of about 7 and then dried to obtain whole or fragmented peanut hearts which are substantially free of bitterness.

With reference to FIG. 1, a first embodiment is illustrated for the preparation of fragmented or whole debittered peanut hearts. Whole peanut hearts are provided and are optionally blanched in hot (greater than about 90° C.) or, preferably, boiling water (e.g., for approximately 3 minutes or more) and then rinsed with cold water. The optional blanching may be repeated multiple times until the blanched peanut hearts are sufficiently soft to allow for diffusion of the later performed alkali washing. The purpose of the optional blanching step is to inactivate enzymes and also to soften the peanut tissue such that subsequent alkali washing provided in connection with this process will be effective. The softening of the peanut hearts facilitates the diffusion of the alkaline solution wash into the peanut heart material. Thus, it is generally preferred that one or more blanching steps be included in the present process. The alkaline wash step may be repeated multiple times (e.g., 2–6 times as shown in FIG. 1), such that the blanched or unblanched peanut hearts are then resuspended in an aqueous alkali solution (e.g., 1N NaOH) to a pH of about 8 to about 12 (preferably about 10 to about 11). The alkalized peanut heart material may then be mixed (e.g., for about 45 minutes or more) at about 25 to about 65° C., and preferably at about 50° C. The method of debittering the peanut heart material thus includes adjusting the pH with an alkali such as sodium, potassium, calcium, or magnesium hydroxides to solubilize the protein content and release the bitter flavor compounds, making it possible to separate the compounds. The one or more washing steps using aqueous alkaline are generally carried out at a temperature of about 25 to about 65° C.

After the end of the alkaline washing, the alkaline solution may be removed using conventional techniques (e.g., filtration, decanting, centrifugication, and the like). The peanut heart material can then be rinsed several times (e.g., 1–6 times or more) with an aqueous acidic solution. This neutralizing step, including washing and rinsing, may be repeated multiple times with a aqueous acidic solution (e.g., 0.5N HCl) to a pH of about 5 to about 7.5, and preferably about 7; generally the neutralized step is repeated about 1–6 times or more as needed. The whole peanut heart material is then dried using conventional techniques, including a conduction oven, convection oven, a belt dryer, a fluid bed dryer, a freeze drier, a spray dryer, or the like. If desired, this material can be roasted using conventional techniques prior to use.

Figure 2:
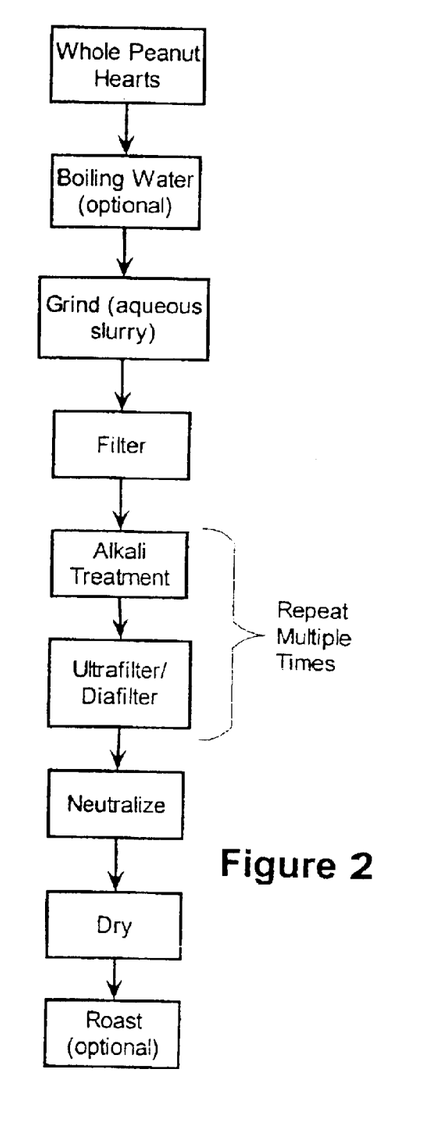
FIG. 2 is a block diagram of another process employing the invention in which optionally blanched peanut hearts are ground to form an aqueous slurry and then filtered to remove large particles (although not shown, this filtration step can be carried out after the pH of the slurry is adjusted). The resulting suspension is treated with an aqueous alkali solution and then ultrafiltered/diafiltered multiple times to remove flavor components associated with bitterness. The resulting product is then neutralized and dried to obtain a peanut heart powder which is substantially free of bitterness.

With reference to FIG. 2, a second embodiment is illustrated for the preparation of debittered peanut heart powder using an ultrafiltration (UF) (with or without diafiltration) step to assist in the removal of the bitter flavor. The whole peanut hearts are optionally blanched in hot (greater than about 90° C.) or, preferably, boiling water and ground into an aqueous slurry. Generally blanching is preferred as it has the same effect as described above in the discussion of FIG. 1. The blanched or unblanched peanut heart material may be finely ground in water using conventional techniques (e.g., food grinder, food processor, wet milling equipment, or the like) to obtain a slurry with a solids content of about 5 to about 50 percent and preferably of about 10 to about 25 percent. Generally, the average particle size of the ground peanut heart material is about 1 to about 100 microns, preferably about 10 to about 80 microns, and more preferably about 50 to about 75 microns.

The slurry is filtered to remove relatively large insoluble particulates (generally particles greater than about 100 microns in diameter or length), including, for example, insoluble fiber. This initial filtering step may be performed, for example, with a cheese cloth, a coarse membrane filter, strainer, or the like. The resulting aqueous slurry may then be alkalized with hydroxides as discussed above (e.g., using 1N NaOH) to a basic pH of about 8 to about 12 (preferably about 10 to about 11). Alternatively, the pH of the slurry may be adjusted prior to removal of the relatively large insoluble particulates by filtration. Adjusting the pH to the desired range with an alkali allows solubilization of the protein content and release of the bitter flavor compounds, making it possible to use an ultrafiltration membrane to separate the bitter flavor components. Suitable ultrafiltration membranes generally have a molecular weight cutoff (MWCO) in the range of about 10 K to about 50 K. The ultrafiltration can be used alone or in combination with diafiltration. Preferably, ultrafiltration combined with diafiltration is employed.

The suspension is then successively treated multiple times (e.g., two or more times) with the alkali treatment and ultrafiltration (with or without diafiltration). The ultrafiltration uses a membrane capable of retaining substantially all of the protein content while removing bitter flavoring components as permeate. The permeate containing bitter flavor components and water can be treated with a reverse osmosis membrane to dewater the permeate and the separated water can be recycled with or without recycled retentate and fresh pH-adjusted peanut materials. A portion of the retentate can be continually removed and the debittered peanut heart materials recovered. The peanut heart materials can be processed in batch, semi-continuous, or continuous mode wherein a pH-adjusted aqueous slurry is subject to ultrafiltration, the permeate is separated for removal and/or recovery of the bitter components, and the retentate (free of bitter flavor components) is recycled to treat fresh pH-adjusted peanut materials. Water can be added periodically or continuously to replace the water lost to the permeate and to adjust the concentration of peanut materials in the combined stream to a predetermined level. The process is continued until essentially all of the bitter flavoring compounds have been removed. When ultrafiltration is complete, the debittered slurry is treated with an aqueous acidic solution (e.g., 0.5N HCl) to adjust the pH to about 5 to about 7.5, and preferably to about 7. The neutralized peanut slurry may then be dried using conventional techniques (e.g., conduction or convection ovens, a fluid bed type dryer, thin-film dryer, freeze dryer, spray dryer, and the like) to provide a dry debittered peanut powder. This debittered peanut powder may be added directly to the desired food product or may be hydrated (e.g., about 10 percent solids) before being added. If desired, this material can be roasted prior to use using conventional techniques.

Figure 3:
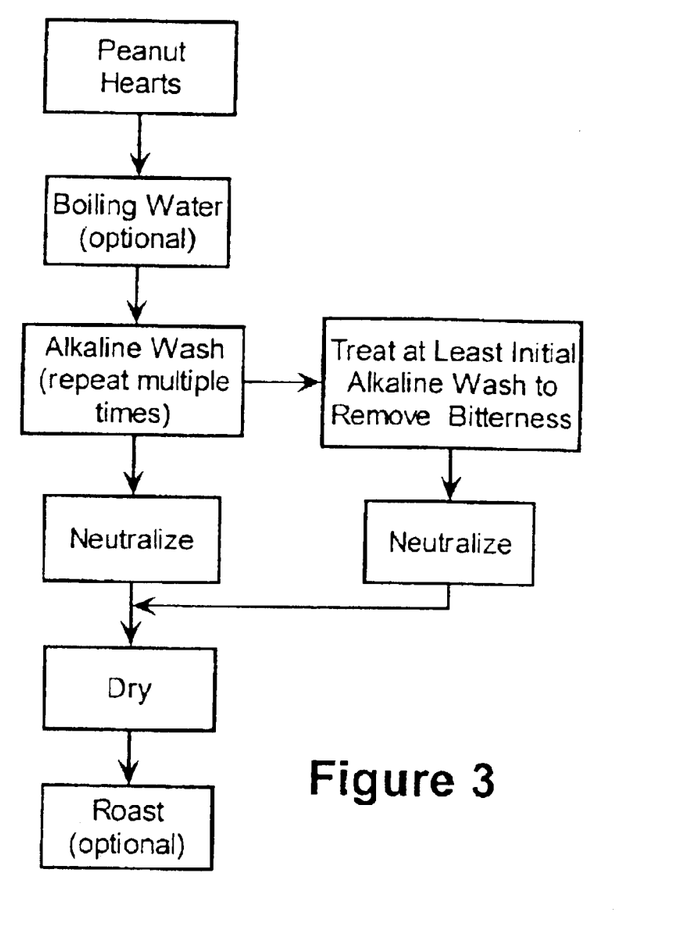
FIG. 3 is a block diagram of another process employing the invention in which peanut hearts are optionally blanched in boiling water followed by successive washings (e.g., about 1–6 washings) in an aqueous alkaline solution (e.g., 1N NaOH) at about 25 to about 65° C. and at least the initial wash solution is treated to remove bitterness while maintaining flavor compounds or precursors, neutralized, and then added to the peanut heart material prior to drying. The alkaline-washed peanut hearts are then neutralized with an acidic aqueous solution (e.g., 0.5N HCl) to a pH of about 7 and then dried to obtain peanut hearts which are substantially free of bitterness and which have improved peanut flavor.

With reference to FIG. 3, a third embodiment is illustrated wherein at least the first wash solution is treated to remove or significantly eliminate undesirable bitter compounds while maintaining flavor compounds or precursors so that the flavor compounds or precursors can be added back to the peanut heart material to provide a debittered peanut heart material with improved peanut flavor characteristics. Peanut heart material is provided and optionally blanched in hot (greater than about 90° C.) or, preferably, boiling water (e.g., for approximately 3 minutes or more) and then rinsed with cold water. The optional blanching may be repeated multiple times until the blanched peanut hearts are sufficiently soft to allow for diffusion during the later performed alkali washing steps. The purpose of the optional blanching step is to inactivate enzymes and also to soften the peanut tissue such that subsequent alkali washing provided in connection with this process will be effective. The softening of the peanut hearts facilitates the diffusion of the alkaline solution wash into the peanut heart material. Thus, it is generally preferred that one or more blanching steps be included in the present process.

The alkaline wash step may be conducted only once (if sufficient bitterness is removed) or may be repeated multiple times (e.g., 2–6 times), such that the blanched or unblanched peanut hearts are then resuspended in an aqueous alkali solution (e.g., 1N NaOH) to a pH of about 8 to about 12 (preferably about 10 to about 11). The alkalized peanut heart material may then be mixed (e.g., for about 45 minutes or more) at about 25 to about 65° C., and preferably at about 50° C. The method of debittering the peanut heart material thus includes adjusting the pH with an alkali such as sodium, potassium, calcium, or magnesium hydroxides to solubilize the protein content and release the bitter flavor compounds, making it possible to separate the compounds. The one or more washing steps using aqueous alkaline are generally carried out at a temperature of about 25 to about 65° C.

After the end of the alkaline washing or after the end of each alkaline washing step, the alkaline solution may be removed using conventional techniques (e.g., filtration, decanting, centrifugication, and the like). At least a portion of the wash solution is collected in order to be treated to remove the bitter flavor compounds without significantly removing peanut flavor components or precursors contained therein. Although more of the wash solution can be treated, it is generally preferred that only the first or initial wash solution is treated in such a manner. The wash solution can be treated with an enzyme having glycosidease activity, which will effectively remove or reduce bitterness in the wash solution while maintaining significant levels of flavor components or precursors. Enzymes having glycosidease activity include, but are not limited to, amylases, glucoamylases, glucosidases, galactosidases, lactases, and the like as well as mixtures thereof. Proteases and lipases having glycosidease activities can also be used. The treated wash solution, when added back to the treated peanut material before drying, will allow the development of improved peanut flavors in the final product.

The peanut heart material can be rinsed once or several times (e.g., 2–6 times or more) with an aqueous acidic solution. This neutralizing step, including washing and rinsing, may be repeated multiple times with an aqueous acidic solution (e.g., 0.5N HCl) to a pH of about 5 to about 7.5, and preferably about 7; generally the neutralized step is repeated about 1–6 times or more as needed. The treated wash solution can be added to the peanut heart material before, after, or during the neutralization step so long as both the peanut heart material and the treated wash solution are both neutralized. The treated wash solution is preferably neutralized is a separate step and then added back to the peanut heart material just before the drying step so as to maximize the amount of the peanut flavor components or precursors contained in the resulting product. The peanut heart material is then dried using conventional techniques, including conduction or convection ovens, a belt dryer, a fluid bed dryer, a freeze dryer, a spray dryer, and the like. If desired, this material can be roasted using conventional techniques prior to use.

The present invention provides improved usability of peanut heart material in peanut products for human consumption since the debittered peanut hearts produced have essentially no bitter taste and a pleasant peanut flavor. The following examples are provided to illustrate the invention and not to limit it. Unless otherwise indicated, all percentages and ratios are by weight. One skilled in the art will understand that suitable operating parameters will be determined by experience with the materials being separated. All patents and other publications cited herein are hereby incorporated by reference.

EXAMPLE 1

Peanut hearts (300 g) were blanched in boiling water (1 liter tap water) for 2–10 minutes. The blanched hearts were rinsed with cold water. Blanching was repeated twice. Blanched hearts were then resuspended in 600 g fresh water. The suspension was alkalized to pH 11 with 1N NaOH, and then mixed in a jacketed beaker at about 50° C. for about 30–45 minutes. At the end of the wash, the hearts were rinsed with fresh water. The washing and rinsing was repeated 4 times. The peanut hearts were then resuspended in water, neutralized to pH 7 with 0.5N HCl, and mixed for five minutes. The neutralizing water was decanted and the hearts were dried overnight in a convection oven at 50° C. Dry debittered peanut hearts were sensory evaluated by several colleagues. The debittered samples were characterized as bland with no bitter taste detected.

EXAMPLE 2

Blanched peanut hearts were suspended in water and then thoroughly ground into a slurry (about 10 percent solids) in a food processor. The slurry was then filtered through a cheese cloth to remove large particulate (large insoluble fibers). The filtrate suspension was then adjusted to pH 11 with 1N NaOH, and ultrafiltered through a hollow fiber membrane with 30 K MWCO. The alkaline washing and ultrafiltration was repeated five times. The product was neutralized to a pH of about 7 with 0.5N HCl. The slurry was freeze dried. Dry debittered peanut heart powder was hydrated in water at about 10 percent solids; no bitter taste was detected in the end product.

EXAMPLE 3

Unblanched peanut hearts (500 g) were mixed with water (1000 g) at about 50° C. The pH of the mixture was adjusted to about 10 using 1N NaOH and then stirred at about 50° C. for about 45 minutes; additional base was added as needed to maintain the pH at about 10. The peanut hearts were washed with fresh water and drained. The alkaline wash treatment was repeated for a total of three wash cycles. After completion of the final alkaline wash, the peanut hearts were suspended in fresh water, neutralized to pH 7 with 0.5M HCl, and mixed for about 5 minutes. After decanting the water layer, the peanut hearts were dried in a fluid bed drier (Glatt Agglomerator) at about 80° C. for about 100 minutes to a moisture content of about 2 to about 5 percent. The dried peanut hearts (100 g at a time) were then dry roasted in a bench top Neuhaus Neotec roaster at about 200° C. for about 370 seconds. The dry roasted debittered peanut hearts were characterized by a taste panel as being peanutty in flavor with only a very slight bitter aftertaste.

EXAMPLE 4

This example illustrates the preparation of debittered peanut heart material having improved peanut flavor characteristics. Peanut hearts (400 g) were added to 800 g water at 50° C. with stirring. The pH was adjusted to about 10 by adding 1N NaOH. The pH-adjusted mixture was held at 50° C. with stirring for about 45 minutes. The alkaline wash solution was then collected by straining and then neutralized to a pH of about 7 by adding 0.5N HCl. Fresh water was added to the separated peanut hearts and then neutralized to a pH of about 7 by adding 0.5N HCl. The peanut hearts (634 g) were collected by straining using a 20 mesh strainer and the neutralized rinse water discarded. The peanut hearts were dried for 45 minutes at 80° C. in a Glatt Fluid Bed Dryer (Glatt Air Technologies, Inc., Ramsey, N.J.). About 346 g of partially dried peanut heart material was obtained.

The neutralized alkaline wash solution was divided into two samples (about 297 g each) for treatment with two different enzymes in order to remove bitter compounds while maintaining flavor compounds or precursors. Sample 1 of the neutralized alkaline wash solution was treated with 1 g β-galactosidase (Validase TR enzyme; Valley Research, Inc., South Bend, Ind.) at 40° C. for 4 hours. Sample 2 of the neutralized alkaline wash solution was treated with 1 g Enzeco® fungal lactase enzyme (Enzyme Development Corp., New York, N.Y.) at 40° C. for 4 hours.

The partially dried peanut heart material was divided into two samples (about 173 g each). Each sample of partially dried peanut heart material was then soaked in either Sample 1 or Sample 2 of the neutralized alkaline wash solution for about 240 minutes. The peanut heart material as well as unabsorbed wash solution from each sample were then collected by straining using a 20 mesh strainer. The collected peanut heart material was then partially dried again using either the Gatt Fluid Bed Dryer (80° C. for 45 minutes) for Sample 1 treated material or a Lab-Line Fluid Drier (80° C. for 30 minutes) for Sample 2 treated material. The newly partially dried peanut heart material was then again soaked in the appropriate collected unabsorbed wash solution, separated from unabsorbed wash solution, and then redried as described above. This procedure was repeated for each sample until all the wash solution had been absorbed.

The resulting peanut heart material obtained from each sample was finally dried to a moisture content of about 3 to 8 percent and then roasted in a Neuhaus Neotec Coffee Roaster (Neuhaus Neotech Maschinen und Anlagenbau GmbH, Ganderkesee/Hoykenkamp, Germany) at 200° C. for 75 seconds (material treated with Sample 1 wash solution) or 45 seconds (material treated with Sample 2 wash solution).

Both samples of peanut heart material exhibited significant reduction of bitter flavor and improved peanut flavor. As compared with the peanut heart material produced in Example 1, these samples were comparable with regard to lack of bitterness but had much improved desirable peanut flavors. Generally, the sample treated with β-galactosidase (i.e., Sample 1) had higher levels of roasted notes and was less likely to burn during roasting.

What is claimed is:

1. A method of obtaining peanut heart material substantially free of bitter taste and having improved peanut flavor, the method comprising:
   (1) washing peanut heart material with an aqueous alkaline solution;
   (2) separating and collecting the washed peanut heart material and the aqueous alkaline solution;
   (3) repeating steps (1) and (2) until the peanut heart material is substantially free of bitter taste;
   (4) neutralizing the alkaline-washed peanut heart material with a first aqueous acidic solution;
   (5) treating the aqueous alkaline solution collected from at least the first separating and collecting step (2) in order to remove bitter compounds while maintaining flavor compounds or precursors therein;
   (6) neutralizing the treated aqueous alkaline solution from step (5) with a second aqueous acidic solution;
   (7) treating the neutralized alkaline-washed peanut heart material from step (4) with the neutralized aqueous alkaline solution from step (6); and
   (8) drying the peanut hearts from step (7) to obtain the peanut heart material substantially free of bitter taste and having improved peanut flavor.

2. The method as recited in claim 1, wherein the aqueous alkaline solution collected from at least the first separating and collecting step (2) is treated with an enzyme having glycosidease activity in order to remove bitter compounds while maintaining flavor compounds or precursors therein.

3. The method as recited in claim 1, wherein the peanut heart material is blanched in hot or boiling water prior to step (1).

4. The method as recited in claim 2, wherein the peanut heart material is blanched in hot or boiling water prior to step (1).

5. The method as recited in claim 1, wherein the aqueous alkaline solution contains sodium hydroxide, potassium hydroxide, calcium hydroxide, magnesium hydroxide, or mixtures thereof.

6. The method as recited in claim 2, wherein the aqueous alkaline solution contains sodium hydroxide, potassium hydroxide, calcium hydroxide, magnesium hydroxide, or mixtures thereof.

7. The method as recited in claim 1, wherein steps (2) and (3) are repeated about 4 to about 6 times.

8. The method as recited in claim 2, wherein steps (2) and (3) are repeated about 4 to about 6 times.

9. The method as recited in claim 1, wherein the aqueous alkaline solution contains sodium hydroxide and wherein step (1) is carried out at about 25 to about 65° C.

10. The method as recited in claim 2, wherein the aqueous alkaline solution contains sodium hydroxide and wherein step (1) is carried out at about 25 to about 65° C.

11. The method as recited in claim 5, wherein sufficient aqueous alkaline solution is used in step (1) to obtain a pH of about 8 to about 12.

12. The method as recited in claim 6, wherein sufficient aqueous alkaline solution is used in step (2) to obtain a pH of about 8 to about 12.

13. The method as recited in claim 1, wherein neutralizing the alkaline-washed peanut heart material is neutralized with an acidic aqueous solution to a pH of about 5 to about 7.5.

14. The method as recited in claim 2, wherein neutralizing the alkaline-washed whole or fragmented peanut heart material is neutralized with an acidic aqueous solution to a pH of about 5 to about 7.5.

15. The method as recited in claim 1, wherein the peanut heart material from step (8) is roasted.

16. The method as recited in claim 2, wherein the peanut heart material from step (8) is roasted.

* * * * *